US010075024B2

(12) United States Patent
Ahmad et al.

(10) Patent No.: US 10,075,024 B2
(45) Date of Patent: Sep. 11, 2018

(54) APPARATUS AND METHOD FOR WIRELESS POWER TRANSFER IN FURNITURE

(71) Applicant: La-Z-Boy Incorporated, Monroe, MI (US)

(72) Inventors: Tahir Ahmad, Dundee, MI (US); Chad E. Adams, Perrysburg, OH (US); Larry P. LaPointe, Temperence, MI (US)

(73) Assignee: La-Z-Boy Incorporated, Monroe, MI (US)

( * ) Notice: Subject to any disclaimer, the term of this patent is extended or adjusted under 35 U.S.C. 154(b) by 499 days.

(21) Appl. No.: 14/799,931

(22) Filed: Jul. 15, 2015

(65) Prior Publication Data

US 2016/0344196 A1 Nov. 24, 2016

Related U.S. Application Data

(60) Provisional application No. 62/165,490, filed on May 22, 2015.

(51) Int. Cl.
*H01F 27/42* (2006.01)
*H01F 37/00* (2006.01)
(Continued)

(52) U.S. Cl.
CPC ................ *H02J 50/50* (2016.02); *A47C 7/72* (2013.01); *A47C 7/725* (2013.01); *H02J 50/10* (2016.02); *H02J 50/12* (2016.02)

(58) Field of Classification Search
CPC .. H02J 50/50; H02J 17/00; H02J 5/005; H02J 7/025; H02J 50/12; H01F 38/14; H04B 5/0037; A47C 7/72
See application file for complete search history.

(56) References Cited

U.S. PATENT DOCUMENTS 5,839,788 A * 11/1998 Orr, III .................... A47C 4/54 297/180.12
7,741,434 B2 6/2010 Joannopoulos et al.
(Continued)

OTHER PUBLICATIONS

"Highly Resonant Wireless Power Transfer: Safe, Efficient and over Distance", Dr. Morris Kesler, WiTricity Corporation, 2013, 32 pages.
(Continued)

*Primary Examiner* — Rexford Barnie
*Assistant Examiner* — Rasem Mourad
(74) *Attorney, Agent, or Firm* — Harness, Dickey & Pierce, P.L.C.

(57) ABSTRACT

An article of furniture having an internal frame and an upholstery covering is provided with at least one transmitting resonator carried by said frame and disposed at least partially beneath said upholstery covering. The resonator is tuned for resonance at a predetermined frequency and driven by a high frequency power source also carried by said frame. The high frequency power source is adapted for coupling to a source of electric power external to the article of furniture, such as to an AC outlet. The high frequency power source and transmitting resonator producing in the near field adjacent the at least one transmitting resonator a magnetic field that couples and transfers power at the predetermined frequency. A complementary receiving resonator or a compound passive resonator having two or more coils is coupled to the load to be powered and power is transferred by magnetic induction when the receiving resonator is positioned within the near field of the transmitting resonator.

29 Claims, 19 Drawing Sheets

(51) Int. Cl.

| | |
|---|---|
| ***H01F 38/00*** | (2006.01) |
| ***H02J 50/50*** | (2016.01) |
| ***H02J 50/10*** | (2016.01) |
| ***H02J 50/12*** | (2016.01) |
| ***A47C 7/72*** | (2006.01) |

(56) References Cited

U.S. PATENT DOCUMENTS

| | | | | |
|---|---|---|---|---|
| 2002/0000745 | A1* | 1/2002 | Conte .................... | A47C 3/025 297/302.3 |
| 2007/0222603 | A1* | 9/2007 | Lai ........................ | G06K 7/0008 340/572.7 |
| 2009/0082835 | A1* | 3/2009 | Jaax ........................ | H02J 7/025 607/61 |
| 2011/0156489 | A1 | 6/2011 | Kim et al. | |
| 2011/0241438 | A1 | 10/2011 | Kim et al. | |
| 2012/0086256 | A1* | 4/2012 | Adams ..................... | A47C 7/38 297/408 |
| 2012/0235508 | A1* | 9/2012 | Ichikawa ................ | H02J 50/40 307/104 |
| 2012/0326842 | A1* | 12/2012 | Grinberg ............ | G06K 7/10178 340/10.1 |
| 2013/0106164 | A1 | 5/2013 | Chacon et al. | |
| 2013/0119924 | A1* | 5/2013 | Kasturi ................ | H04B 5/0087 320/108 |
| 2013/0200721 | A1* | 8/2013 | Kurs .................... | H04B 5/0037 307/104 |
| 2014/0021798 | A1* | 1/2014 | Kesler ..................... | H02J 17/00 307/104 |
| 2014/0217785 | A1 | 8/2014 | Arens et al. | |
| 2015/0333572 | A1* | 11/2015 | Leabman ................ | H01F 38/14 320/108 |
| 2016/0149434 | A1* | 5/2016 | Kim ........................ | H02J 5/005 320/108 |
| 2017/0135490 | A1* | 5/2017 | Andrix ................... | A47C 7/748 |

OTHER PUBLICATIONS

"Magnetically Coupled Resonance Wireless Power Transfer (MR-WPT) with Multiple Self-Resonators", Youngjin Park, et al., www.intechopen.com, 15 pages.

"A Critical Review of Wireless Power Transfer Via Strongly Coupled Magnetic Resonances", Zuezhe Wei, et al., www.mdpi.com/journal/energies, 2014, 26 pages.

International Search Report for PCT/US2015/047129 dated Feb. 17, 2016.

Written Opinion of the International Searching Authority for PCT/US2015/0417129 dated Feb. 17, 2016.

International Preliminary Report on Patentability for PCT/US2015/047129 dated Dec. 7, 2017.

* cited by examiner

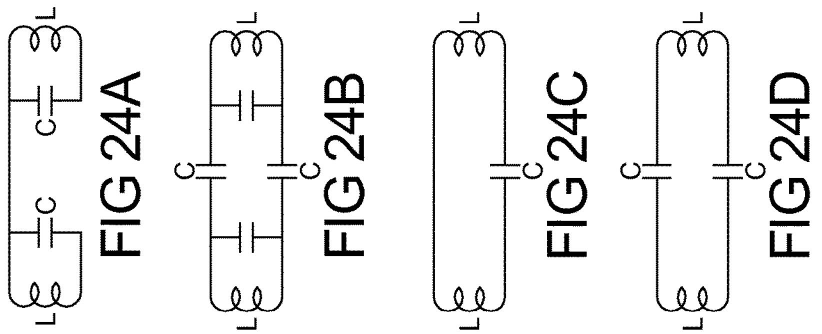
FIG 24A
FIG 24B
FIG 24C
FIG 24D
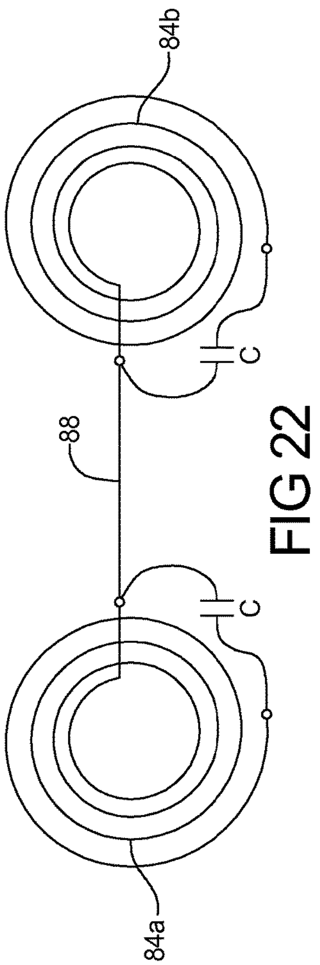
FIG 22
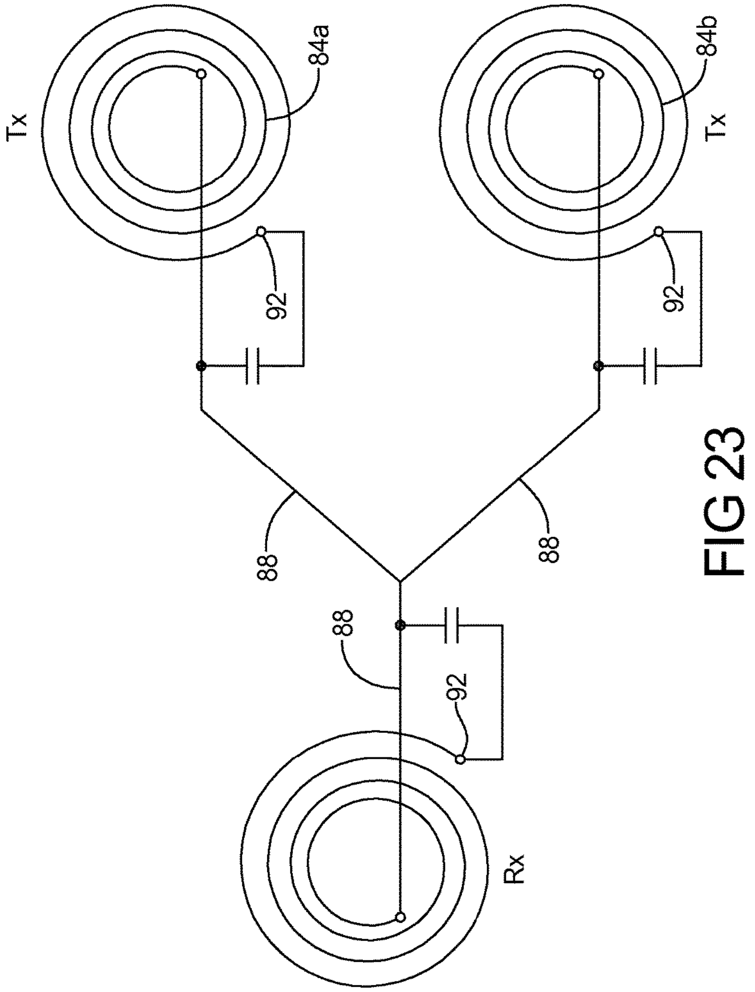
FIG 23

APPARATUS AND METHOD FOR WIRELESS POWER TRANSFER IN FURNITURE

CROSS-REFERENCE TO RELATED APPLICATIONS

This application claims the benefit of U.S. Provisional Application No. 62/165,490, filed on May 22, 2015. The entire disclosure of the above application is incorporated herein by reference.

FIELD

The present disclosure relates generally to chairs, sofas and other furniture having means for supplying electrical power to convenience devices. More particularly the disclosure relates to use of embedded wireless power transfer systems embedded in chairs, sofas and other furniture to provide users with a convenient, wireless way to charge personal devices, power reading lights, massage devices and personal heating and warming devices.

BACKGROUND

This section provides background information related to the present disclosure which is not necessarily prior art.

Whether a person is merely relaxing after a long day of work, or perhaps confined to a sedentary state for medical reasons, the easy chair, sofa or lift chair represents a special, personal environment, a place to rest, recuperate and perhaps enjoy a good book or a favorite television show. Having one's cell phone, e-reader or tablet computer run out of power at such times of repose can certainly destroy the moment. Remain seated and let the device's power fail—or get up and find a charger—those are the basic choices. For a person confined to the chair for medical reasons, the second option may not be possible.

The natural solution would be to run an extension cord to the chair or sofa and then attach a charger where it can be reasonably within reach. Often this entails tucking the charger's transformer under chair or sofa, in an effort to hide its unsightly appearance and straggle of wires. Of course, now that the extension cord has been run, why not use it to power other electric devices, such as reading lights, heating pads and other personal conveniences?

There comes a point, however, where it is simply not good practice to keep plugging more and more devices into the extension cord tucked under the chair or sofa. Extension cords can only handle a finite number of devices, and with every device added, the tangle of wires becomes even more unsightly.

SUMMARY

This section provides a general summary of the disclosure, and is not a comprehensive disclosure of its full scope or all of its features.

The present disclosure solves the aforementioned problem, in an elegant, convenient and useful way. Instead of the extension cord and snarled cluster of many wires, the disclosed solution places wireless power transfer resonators at a convenient location or locations, preferably embedded within the chair, sofa or other piece of furniture. The power transfer resonator produces a localized and concentrated magnetic field that transfers electrical power to a device to be powered. All that is required to receive this power is that the load device be equipped with a receiver resonator, which may be attached to or embedded within the device. For most efficient power transfer the transmitting resonator and the receiving resonator share the same, well defined, high-Q resonant frequency.

The disclosed wireless power transfer apparatus and method is capable of delivering substantial amounts of electric power, easily sufficient to charge personal portable devices and even sufficient to meet the higher power demands of electric heating pads, massage units, warming apparel like foot warmers, blankets and shawls.

Therefore, according to one aspect there is disclosed an apparatus for wireless power transfer comprising an article of furniture having an internal frame and an upholstery covering. At least one transmitting resonator is carried by the frame and disposed at least partially beneath said upholstery covering. This transmitting resonator is tuned for resonance at a predetermined frequency.

A high frequency power source, carried by said frame and electrically coupled to said at least one transmitting resonator, is configured for coupling to a source of electric power external to the article of furniture. This source of electrical power can be, for example, an AC wall outlet and may include a separate AC power supply. The high frequency power source and the transmitting resonator or resonators produce, in the near field adjacent the each transmitting resonator, a localized magnetic field that couples and transfers power at the predetermined frequency.

In this regard, the near field is defined in terms of distance from the transmitting resonator and based on the fact that the non-radiating magnetic field produced by moving currents in the transmitting resonator diminishes at a rate of $1/r^2$ (r being the distance from the resonator). In small electronic device power transfer applications, such as for charging portable devices, mobile phones, ebook readers, tablet computers and the like, suitable results may be obtained over a near field range of separation (between transmitting and receiving resonators) ranging from the thickness of the upholstery material to a maximum separation on the order of 4 to 5 inches. In higher power transfer applications, such as for powering heating elements, a closer separation spacing is preferred, ranging from the thickness of the upholstery material to a maximum separation on the order of 1 to 2 inches.

Also provided may be a receiving resonator adapted to be electrically coupled to a load device. The receiving resonator is tuned for resonance at the predetermined frequency and when placed in the near field adjacent the transmitting resonator it transfers power received from the transmitting resonator to the load device. The load device can be a variety of different devices, including reading lights, device chargers, heating and warming devices, such as footwear, heating pads, blankets and shawls, and the like.

In accordance with another aspect, disclosed is a method for outfitting an article of furniture for wireless power transfer. Therefore, in an article of furniture having an internal frame and an upholstery covering, at least one transmitting resonator is provided to be carried by frame and disposed at least partially beneath the upholstery covering. This transmitting resonator is tuned for resonance at a predetermined frequency.

A high frequency power source is suitably mounted to be carried by the frame and electrically coupled with the at transmitting resonator or resonators. This high frequency power source is configured for coupling to a source of electric power external to the article of furniture.

The high frequency power source and the at least one transmitting resonator are interconnected to produce in the near field adjacent the at least one transmitting resonator a magnetic field that couples and transfers power at the predetermined frequency when coupled to a source of electrical power external to the article of furniture.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 22 is an elevation view of a compound passive resonator illustrating an alternate placement of the single connecting wire and also illustrating placement of discrete capacitors used to tune the coils to resonance with the HF power source;

FIG. 23 is an elevation view of a compound passive resonator illustrating that more than two coils can be used to define the compound passive resonator;

Figure 25:
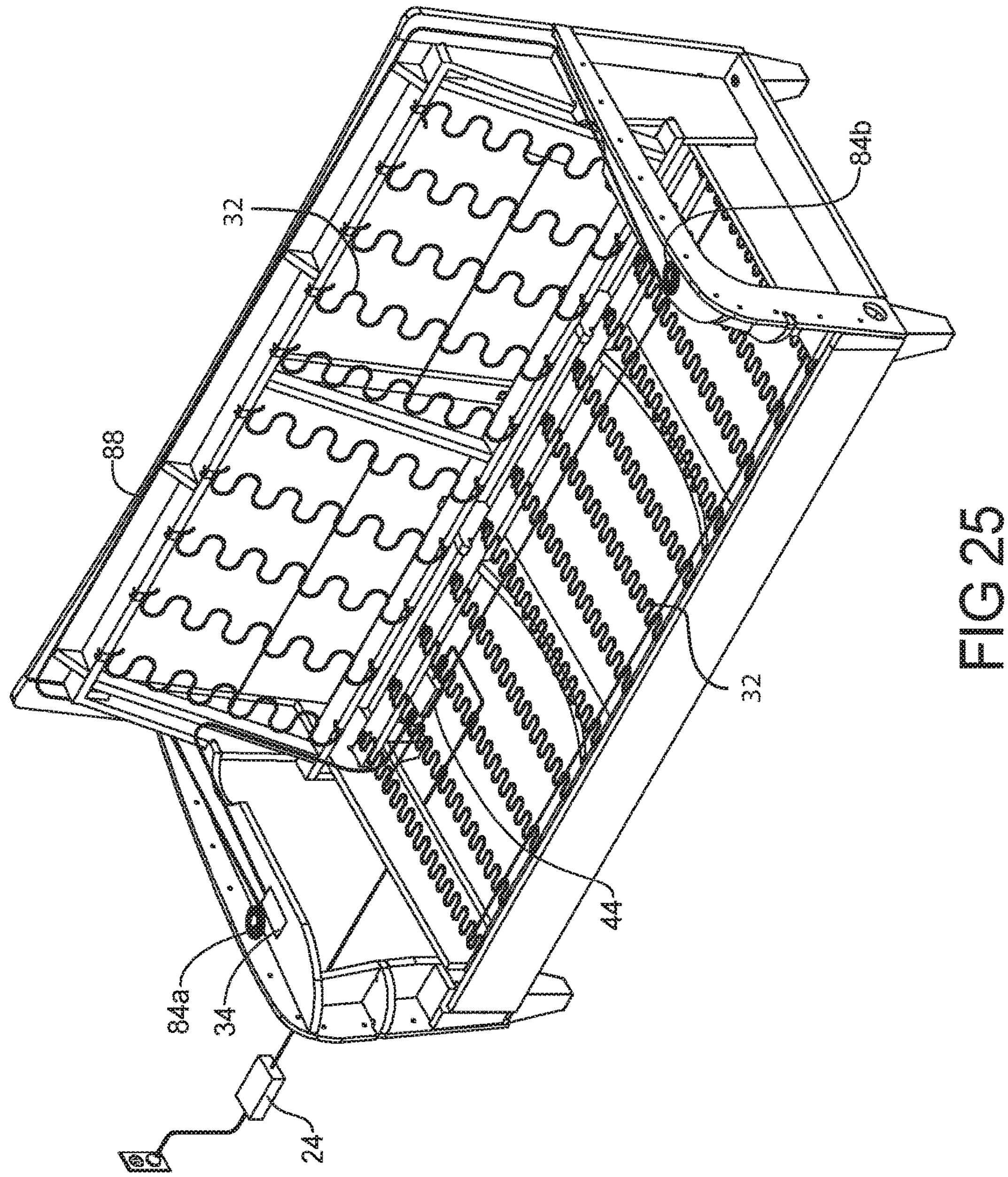
Figure 26:
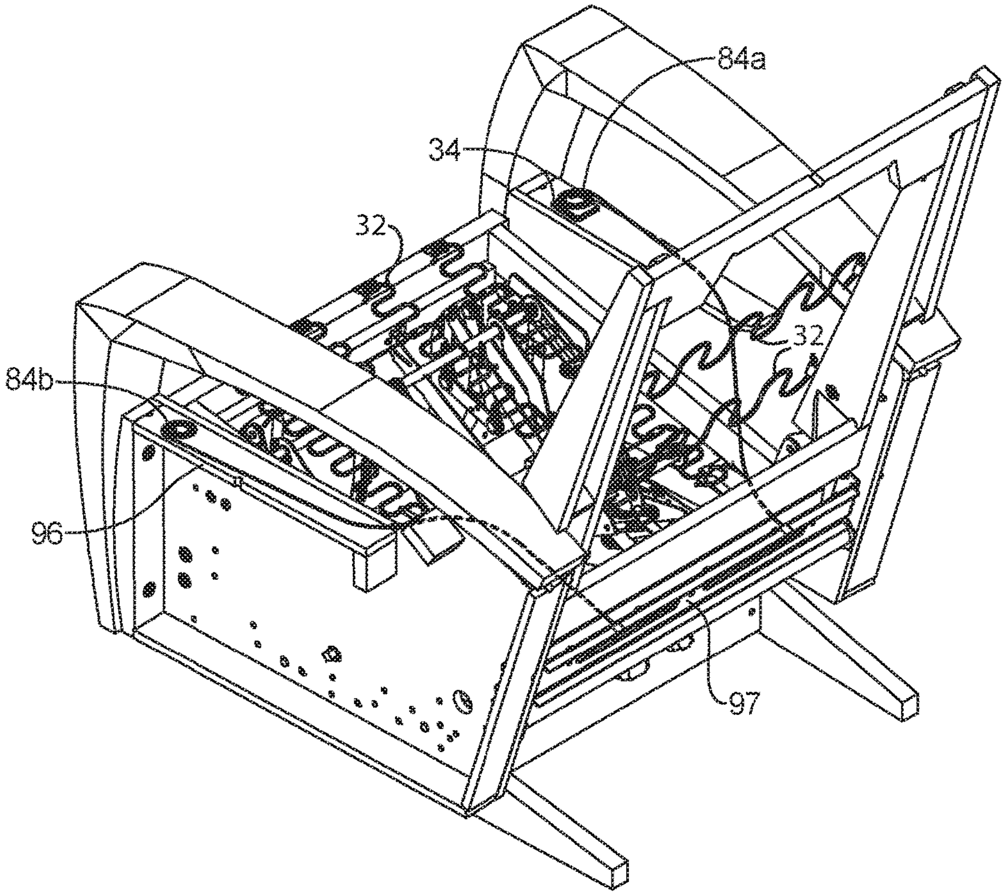

FIGS. **24*a*-24*d*** are electric circuit diagrams illustrating different compound passive resonator circuits and showing various locations where discrete capacitors can be added to achieve resonance with the HF power source;

FIG. 25 is a perspective view of the frame and springs of an exemplary upholstered sofa, showing a first manner of installing the compound passive resonator;

FIG. 26 is a perspective view of the frame and springs of an exemplary open arm chair, showing a second manner of installing the compound passive resonator.

Figure 27:
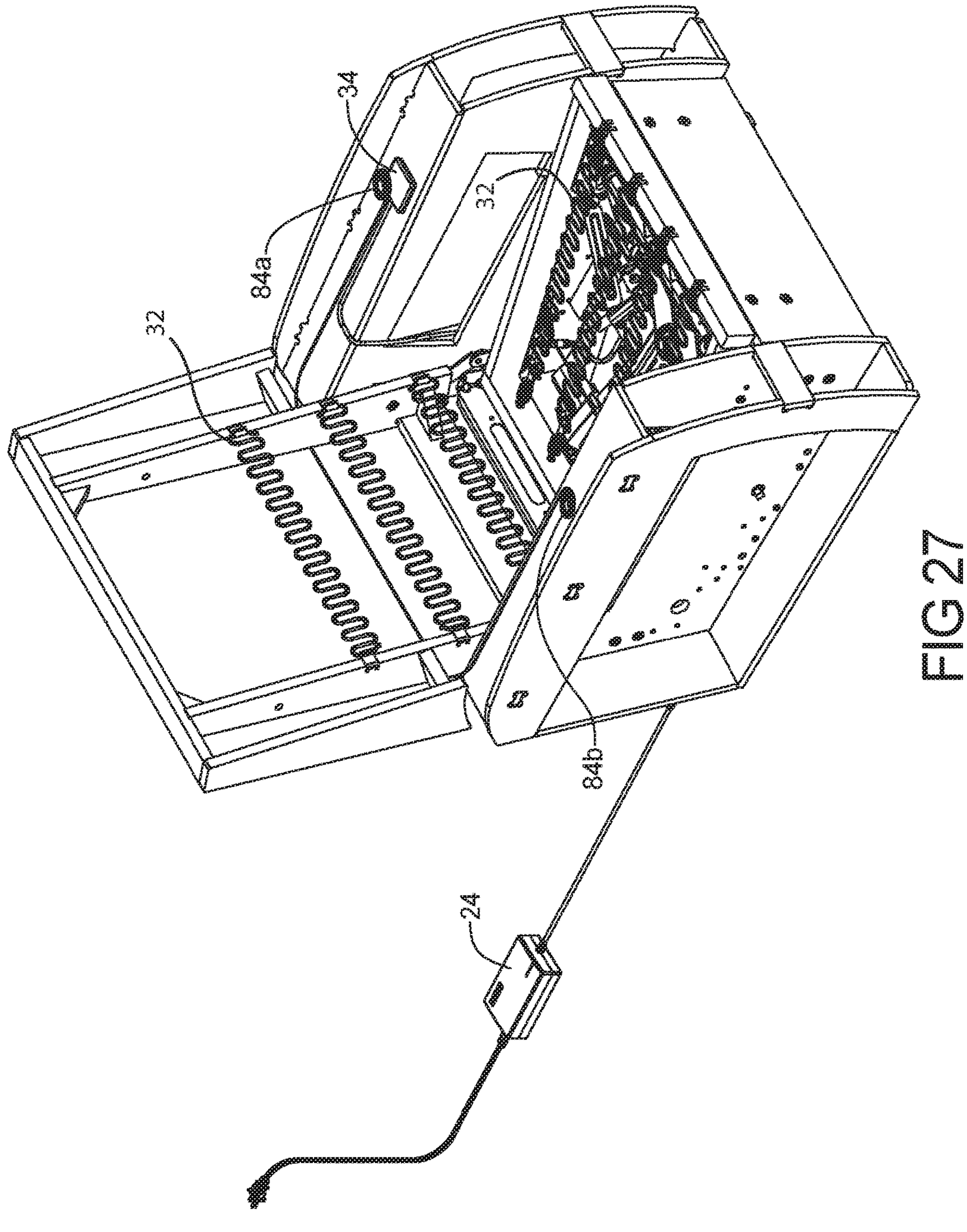
Figure 28:
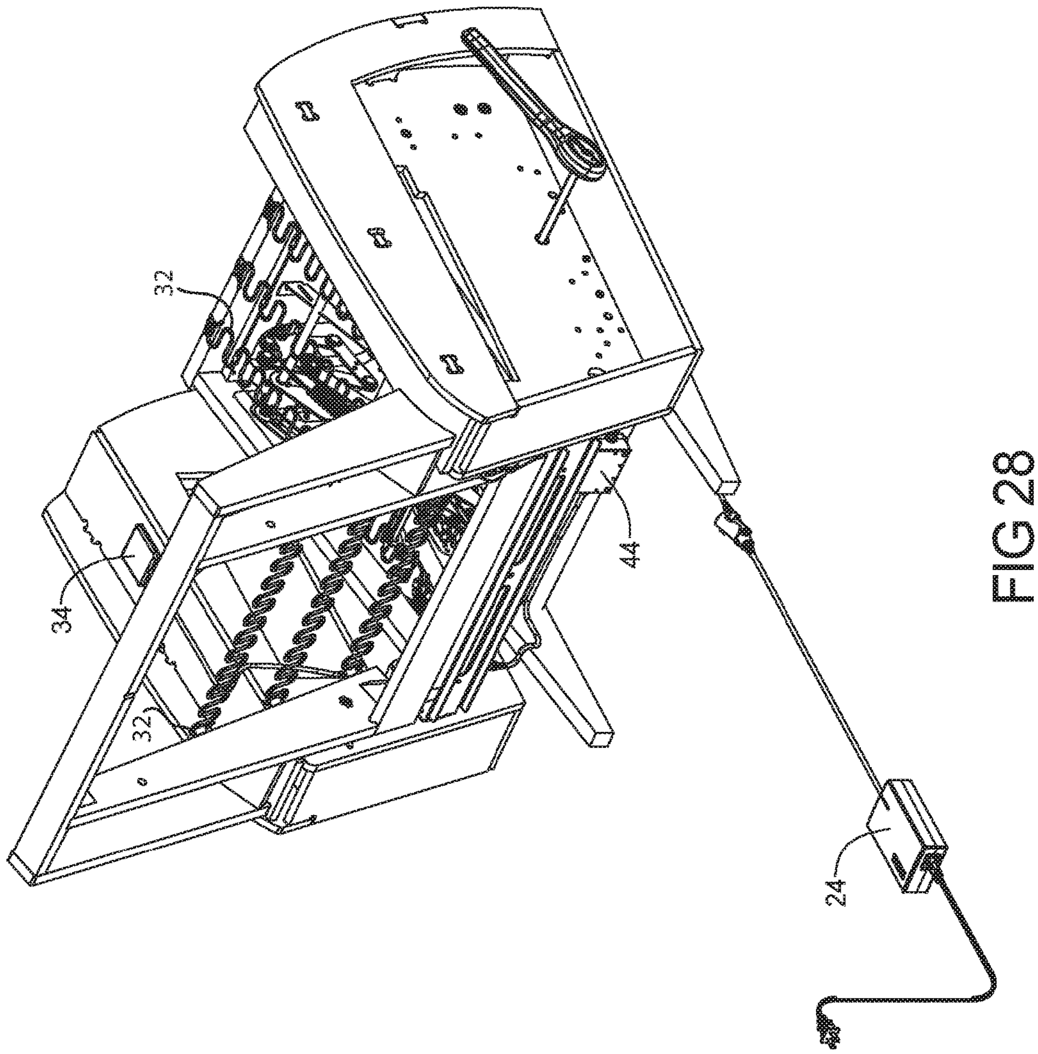

FIG. 27 is a perspective view of a chair showing placement of the compound passive resonator on the frame adjacent the arms;

FIG. 28 is a perspective view of a manually adjustable recliner chair showing placement of the HF power source and transmitting resonator.

Figure 29:
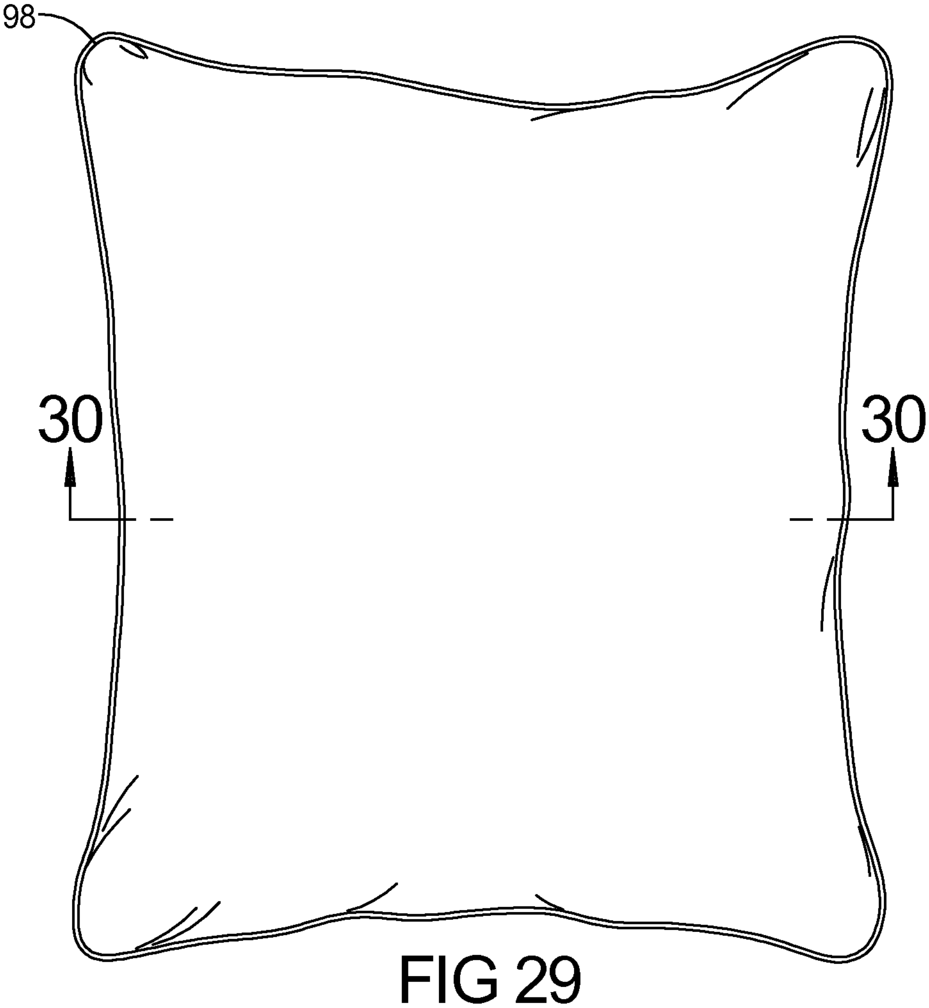
Figure 30:
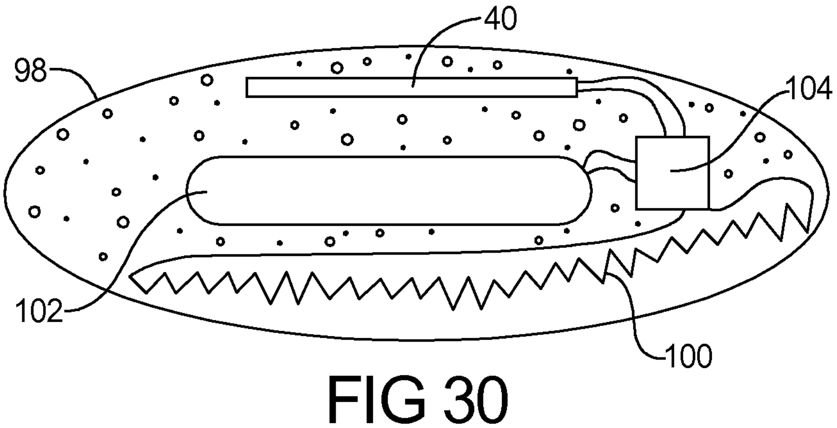

FIG. 29 is a plan view of an occasional or throw pillow that embodies within electrically powered heating and vibrating elements that can be powered using the wireless power transmission system;

FIG. 30 is a cross-sectional view of the pillow of FIG. 27 taken substantially along the lines 28-28 in FIG. 27.

Corresponding reference numerals indicate corresponding parts throughout the several views of the drawings.

DETAILED DESCRIPTION

Example embodiments will now be described more fully with reference to the accompanying drawings.

The disclosed power transmission apparatus and method provides a great deal of convenience and comfort to the user of a suitably equipped chair or sofa. As will be more fully described, electric power, generated within an article of upholstered furniture, such as a chair, sofa, or the like can be transferred to a wide variety of electrical devices external to the article of furniture, including portable devices (e.g., cell phone, e-book readers, iPads and the like), battery chargers, heating pads and blankets, and even clothing worn by the user (e.g., foot warming socks or slippers, slacks, sweaters or jackets, and the like), coffee mug warmers, lighting devices such as reading lights and outline peripheral lighting (to make the item of furniture more visible in darkened rooms), sound generation devices that produce music or white noise to aid a person's ability to fall asleep.

The disclosed power transmission apparatus and method works on a wireless power transmission principle whereby electric energy is delivered to a resonant transmitting resonator, disposed at a predetermined location or locations within the chair or sofa and that energy produces a concentrated magnetic field within the near field of the transmitting resonator. Positioned within that magnetic field, external to the chair or sofa, is a second receiving resonator that captures a portion of the energy within the magnetic field and converts it into electrical energy that can then be used to power an electrical device. In addition to traditional seating types of articles of furniture such as chairs and sofas—which may be stationary or have manual or power motion features, and which may have solid or see-through arms or be armless—the disclosed power transmission apparatus and method works with other types of furniture such as extendable ottomans, sleeper beds and the like.

Figure 1:
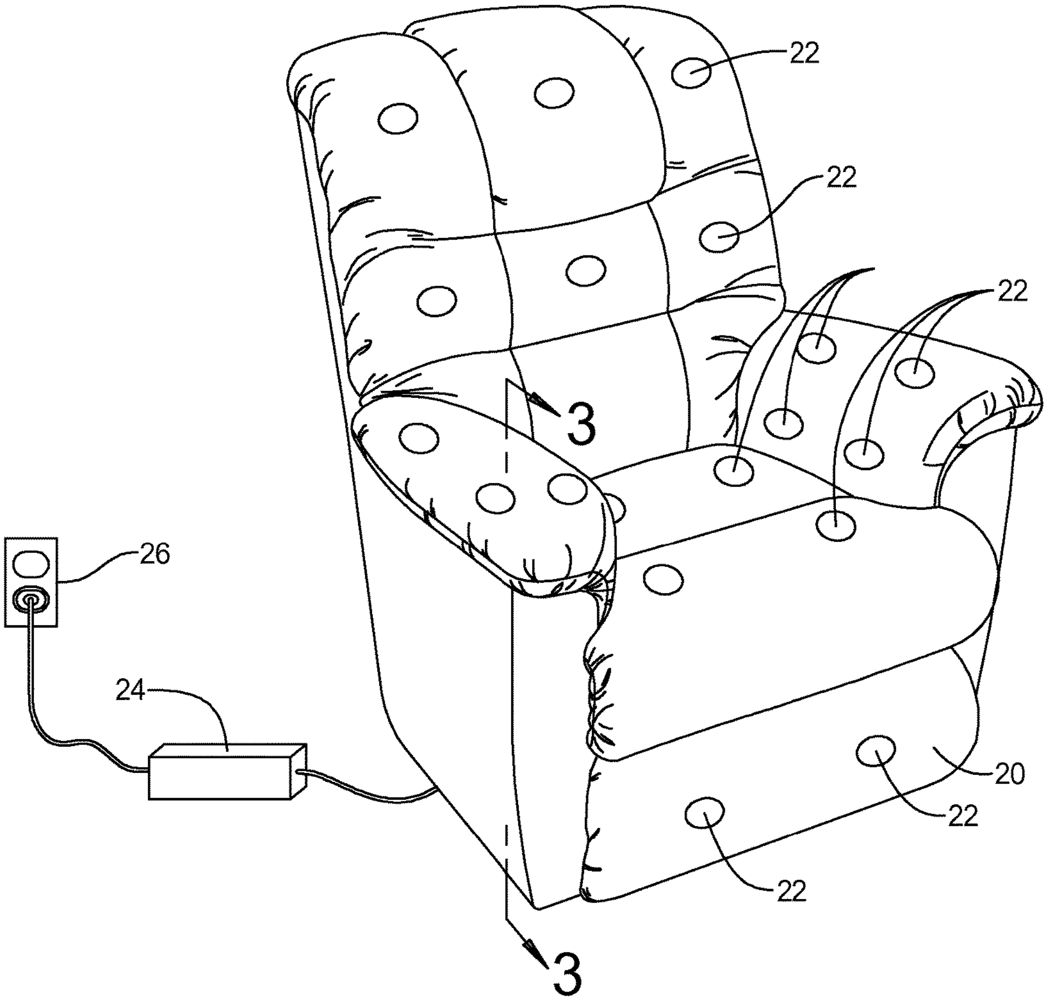
FIG. 1 is a perspective view of an exemplary recliner chair, showing some of the possible resonator placement positions for the wireless power transmission system.

While the apparatus and method can be implemented with only a single transmitting resonator, in many applications a plurality of such transmitting resonators may be preferred. Thus FIG. 1 shows an exemplary recliner chair 20, with a plurality of possible transmitting resonator positions shown at 22. The chair 20 is equipped with a power supply 24 adapted to be connected to a suitable AC outlet 26. In an exemplary application the power supply 24 supplies a low voltage direct current to drive the electronic circuits of the power transmission apparatus and also to drive optional electric motors used to automate recliner and lift chair functions. The power supply 24 may be implemented using a switcher power supply circuit design, which has the advantage of supplying stepped down direct current voltage without the need for large transformer and filter capacitor components. Of course, linear power supply circuit designs may also be used.

Figure 2:
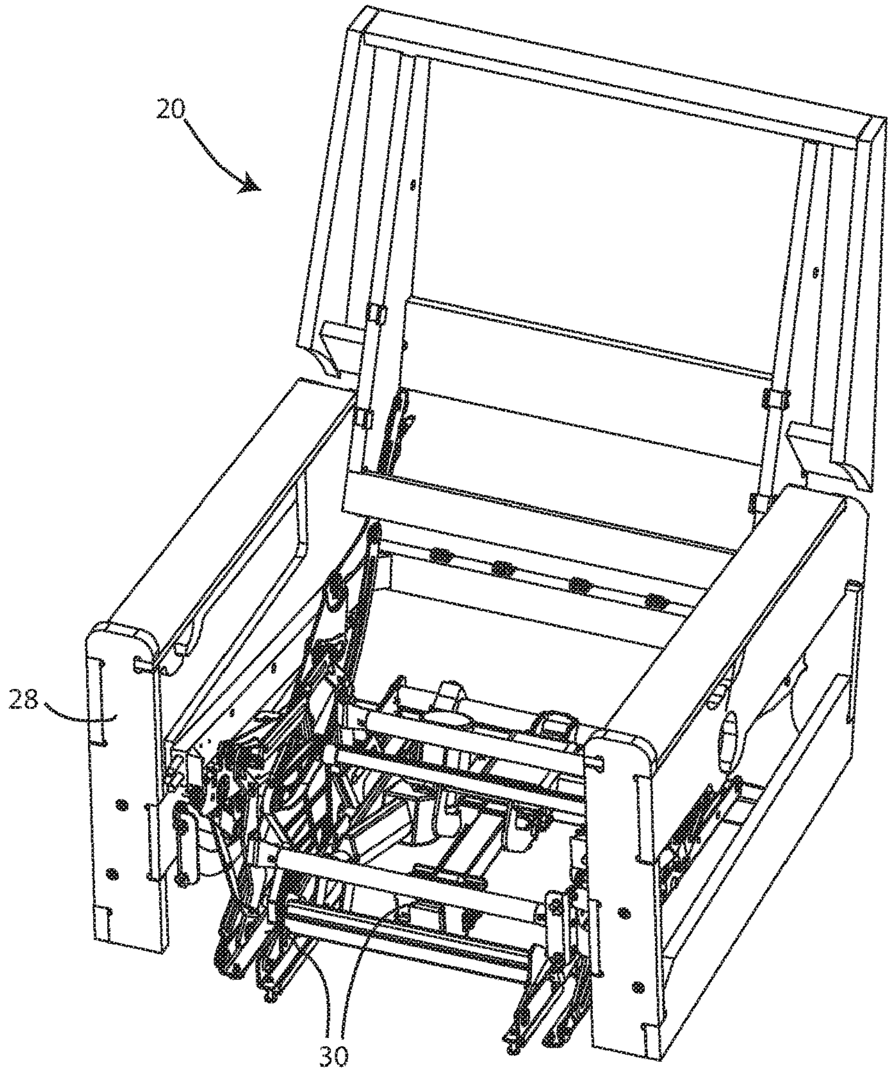
FIG. 2 is a perspective view of the chair of FIG. 1, with fabric and cushioning material removed to show the frame.

FIG. 2 shows the chair 20 with its fabric and cushioning material and springs removed to reveal the underlying frame portions 28 and 30. The associated springs 32 are shown in FIGS. 25-28. In the illustrated chair configuration the frame portion 28 is constructed of a non-ferrous material, such as wood. Frame portion 30 is constructed of steel as are the springs 32. Because the power transmission apparatus and method exploits magnetic energy, attention is given to configure the frame portions 28 and 30 and springs 32 so that the ferromagnetic (e.g. iron, steel, nickel, cobalt, etc.) components do not adversely affect the desired magnetic field. Thus in the chair configuration illustrated, the transmitting resonator locations 22 are selected, and the underlying frame accordingly designed, so that the transmitting resonators do not strongly couple to the ferromagnetic components of the frame and springs. In this regard, according to principles of physics, a magnetic field diminishes at the square of the separation distance. Thus physical distances between resonator placement and ferromagnetic material placement can be calculated and the design configured to minimize close proximity between resonator and the ferromagnetic components. The quantity of ferromagnetic material is also a factor, thus resonator placement is also affected by proximity to any electric motors deployed within the chair, as these typically comprise a large mass of ferromagnetic material.

Figure 3:
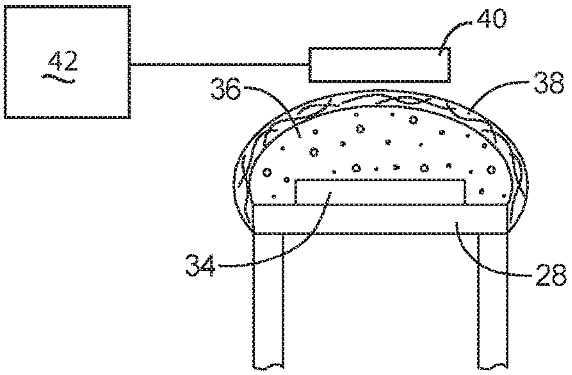
FIG. 3 is a detailed cross-sectional view taken along the line 3-3 in FIG. 1, showing one manner of mounting the transmitting resonator.

Referring to FIG. 3, a cross sectional view through one arm of the chair is illustrated. In this view the transmitting resonator 34 can be seen, attached to frame portion 28 and covered by a layer of upholstery that typically comprises a layer of padding 36 and a covering fabric 38. Being non-magnetic materials, the frame portion 28, padding 36 and fabric 38 have no appreciable effect on the magnetic field produced by transmitting resonator 34. Positioned in the near field of the transmitting resonator is a receiving resonator 40. As illustrated, the transmitting and receiving resonators do not need to be in physical contact in order for power transfer to occur. Indeed, the transmitting and receiving resonators can be spaced apart by several inches (a nominal range being 3 to 8 inches) and still transmit substantial quantities of power to a load 42 attached to the receiving resonator. This is one advantage that magnetic coupling power transfer used here has over capacitive coupling power transfer used in some cellular telephone and small device charging circuits. Typically capacitive coupling systems require very close proximity (on the order of a few millimeters).

Although not seen in FIG. 3, but shown in FIG. 2, the transmitting resonator is connected to a source of high frequency alternating current that generates the magnetic field. This high frequency power source 44 may be attached to the chair frame at any suitable location and is supplied with direct current operating power from power supply 24. Although the high frequency alternating current can be designed to work over a range of frequencies nominally from about 200 kHz to 3000 MHz, a suitable frequency with which to implement power transmission in the chair or sofa is 6.78 MHz. In this regard, suitable wireless power transfer components to implement this 6.78 MHz embodiment are available from WiTricity Corporation.

Figure 4:
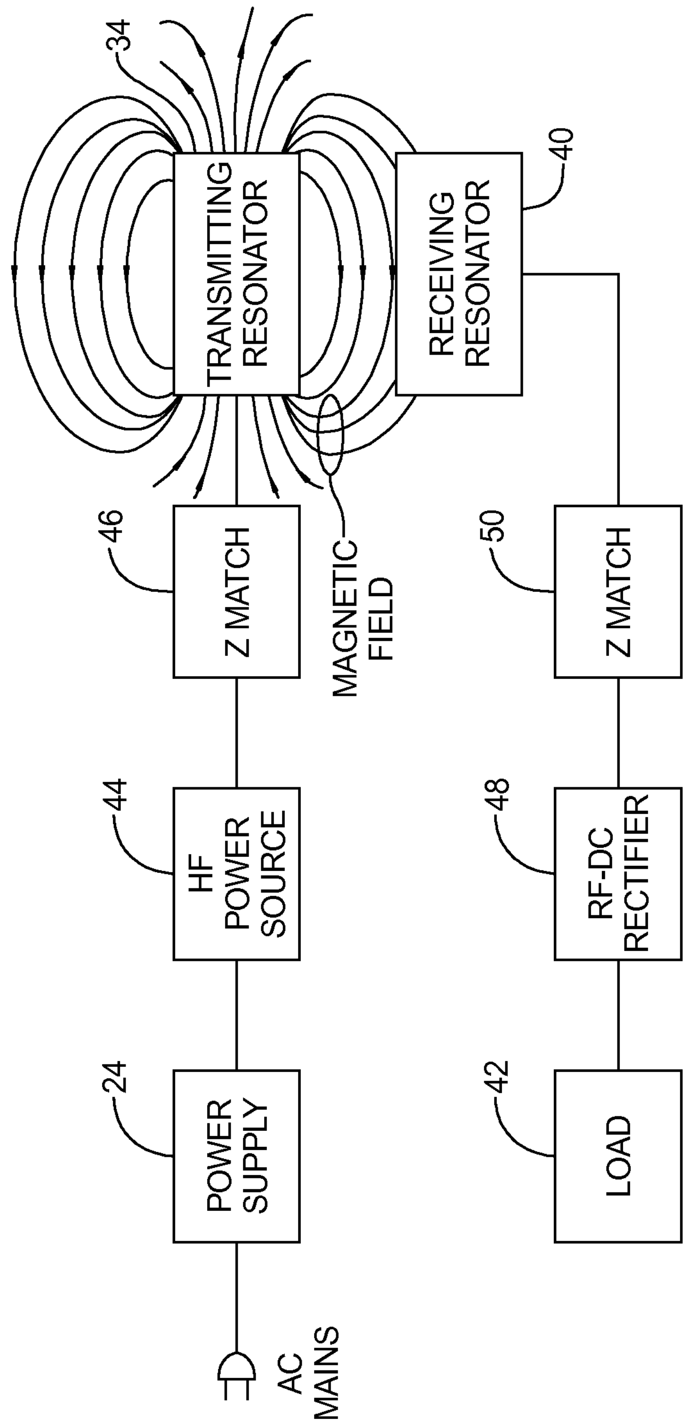
FIG. 4 is an electronic circuit diagram of a transmitting resonator and receiving resonator pair.

FIG. 4 shows an exemplary electronic circuit diagram for generating the magnetic field and for transferring power between the transmitting and receiving resonators. As shown, the power supply 24 provides DC power to the high frequency power source 44. This high frequency power source can be implemented by an electronic switching circuit, such as a class D or class E switching amplifier that generates an oscillating waveform at the desired frequency (e.g., 6.78 MHz.). This high frequency oscillating or alternating current signal is applied to the transmitting resonator 34 to generate the magnetic field. To provide efficient coupling between the power source 44 and the transmitting resonator 34, an impedance (Z) matching network circuit 46 may be employed. The Z matching network is configured to efficiently couple the predominately inductive load of the transmitting resonator to the power source 44, so that power delivered to the resonator 34 is maximized, with minimal energy being reflected back to the power source. The impedance matching network circuit 46 increases the Q factor of the transmitting resonator. The RF link established between a transmitting and receiving resonator pair can also be used for communication between the transmitter and receiver. Such communication can be used for authentication, configuration and monitoring the power transfer. If desired the RF link so established can support communication protocols such as Bluetooth and Wi-Fi.

One advantage of the circuit of FIG. 4 is that it consumes very little power when there is no load attached. The circuit operates in a quiescent state that consumes only the small energy needed to operate the power supply and energize the power source in its resting state. Significant power flow is only experienced when a load is coupled to the magnetic circuit. This occurs when a receiving resonator 40 is positioned within the magnetic field of the transmitting resonator. The receiving resonator is configured to resonantly match the transmitting resonator. Thus magnetic coupling between these two resonators is tuned and highly efficient.

Of course, the power transferred to the receiving resonator is oscillatory at the same frequency as generated at the transmitting resonator (e.g., 6.78 MHz.). As most load devices (heating pads, cell phones, device chargers, and the like) are not designed to operate using power delivered at this high frequency, conversion circuitry is provided to convert the high frequency alternating current (at 6.78 MHz) into DC power at the nominal voltage required by the device (e.g., 6V , 12V , etc.). To perform this conversion, a radio frequency to direct current (RF-DC) rectifier circuit 48 is provided. An impedance matching network circuit 50 is also used to provide efficient coupling between the inductive resonator 40 and the rectifier circuit 48. Comparable to the impedance matching network circuit 46, impedance matching network circuit 50 serves to increase the Q factor of the receiving resonator. The rectifier circuit 48 then supplies power to the load 42.

As noted, power transference between power source 44 and load 42 occurs only when the transmitting and receiving resonators 34 and 40 are magnetically coupled. Thus by simply removing the receiving resonator 40 from the region within the near field of the transmitting resonator 34, power transference to the load is stopped. There is no need for the user to remember to turn switches on and off or to plug and unplug devices from their charging circuits. If the user wants to use a device, or charge a device, he or she simply needs to place the receiving resonator 40 near a transmitting resonator 34 and power transfer to the attached load is automatic.

Figure 5:
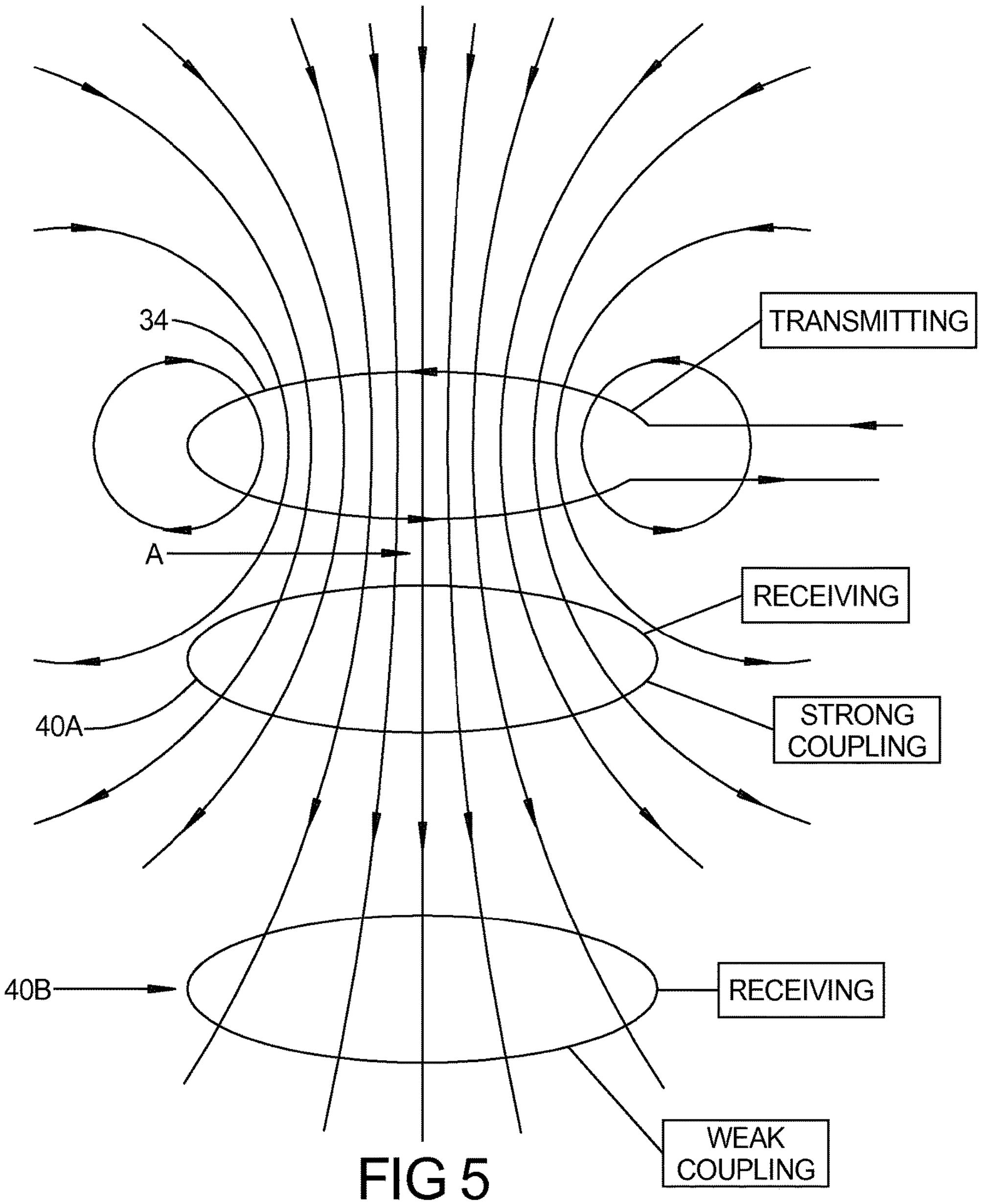
FIG. 5 is a magnetic field diagram illustrating how the transmitting resonator and receiving resonator are coupled in the magnetic near field of the resonators.

FIG. 5 shows the lines of magnetic flux for a simple loop resonator 34. Note how the lines of flux are most densely packed through the annular axis of the loop. These lines of flux are nearly parallel in the near field region A. The lines of flux become less compact and are more divergent (no longer parallel) in the far field region B. When a receiving resonator 40A is positioned in the near field region A, there is strong coupling between the two resonators. Conversely, when the receiving resonator is positioned at 40B in the far field region B, there is weak coupling. When moved far enough away, the coupling between the resonators falls off according to the square of the separation distance and thus rapidly becomes negligible.

Figure 6:
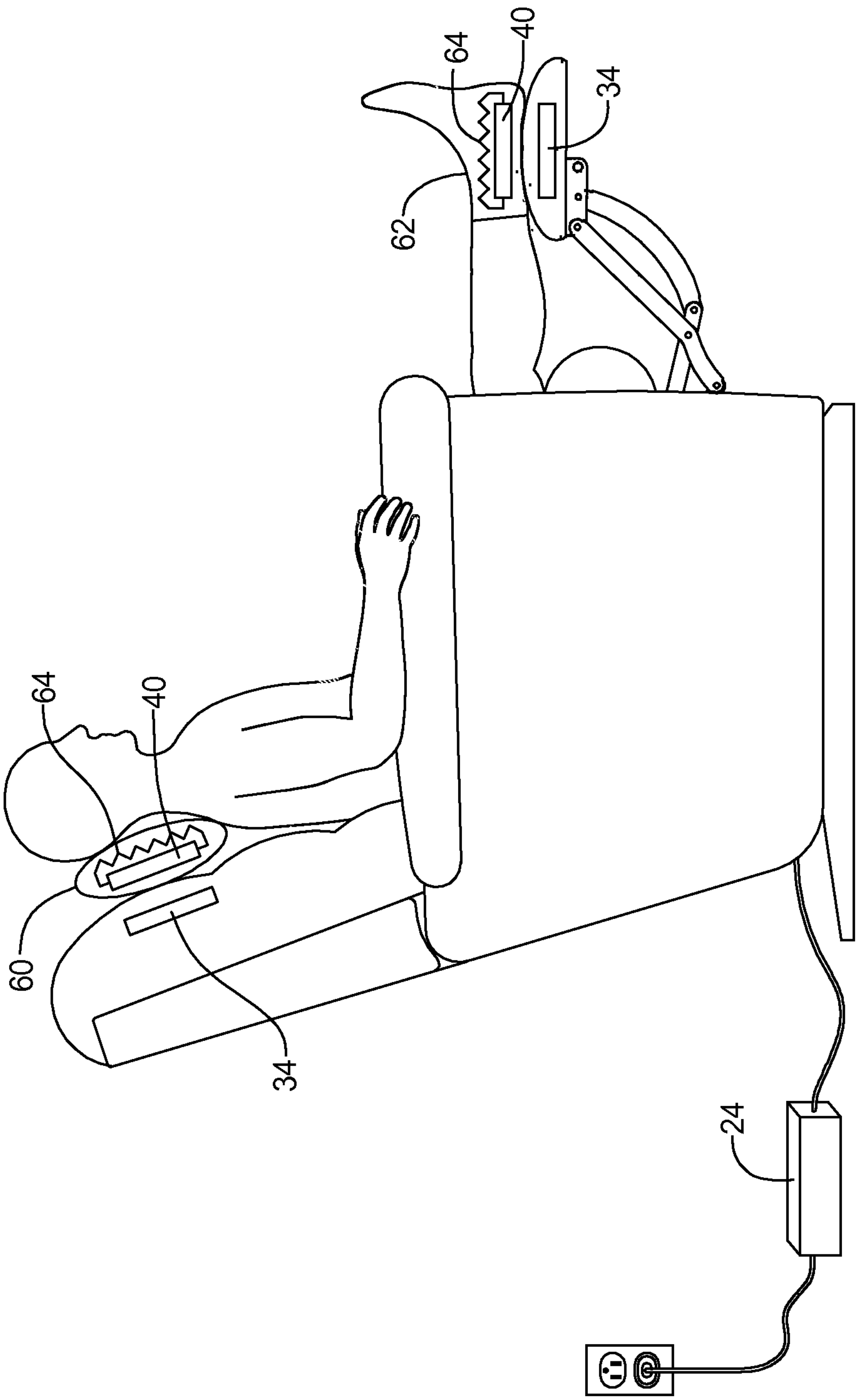
FIG. 6 is a side view of a recliner chair equipped with heating pad and heated slippers, both supplied with power from the wireless power transmission system.

In many applications it is most convenient for the load device to be bundled with the receiving resonator and associated rectifier and matching circuits 48 and 50. These circuits can be deployed in a self-contained package that can be easily embedded in the load device itself, or devised to plug into the load device. For example, in FIG. 6, the user is enjoying a heating pad 60 and a pair of foot-warming socks 62 that are both equipped with integral receiving resonators 40 rectifier circuits (not shown) and heating elements 64. These heating elements are powered by the energy that is coupled through the respective magnetic fields. If desired the heating pad 60 may also include a separate detachable power cord, allowing it to be used by plugging into a conventional power source when not used in conjunction with the chair 20. If desired the heating element can be implemented using a thin metal foil that is heated directly by inductively induced currents flowing in the foil. Alternately, an electric heating wire element can be used.

FIGS. 29 and 30 show in greater detail how an occasional pillow or throw pillow can be equipped with heating and vibration features that are powered by the wireless power transmission system. The pillow 98 may be styled in a variety of different ways, such that no overtly visible signs of the heating and vibration features are apparent to the casual observer. However, as seen from the cross-sectional view of FIG. 30, embedded within the filling of the pillow is a heating element 100, which may be secured to the inner side of the fabric covering of the pillow. Also embedded within the filling of the pillow is a vibration unit 102. The heating element 100 and vibration unit 102 are each electrically coupled to the receiving resonator 40 through a switch 104. The switch 104 is also disposed with the pillow and provides a small button (or pair of buttons) either protruding through the fabric of the pillow or disposed just below the surface. Pressing the button(s) cycles through a sequence of heating and vibrating device selections. For example, the switch 104 may provide a control sequence such as the following:

First press button A—heat on high
Second press button A—heat on low
Third press button A—heat off
First press button B—vibration on
Second press button B—vibration off.

Figure 7:
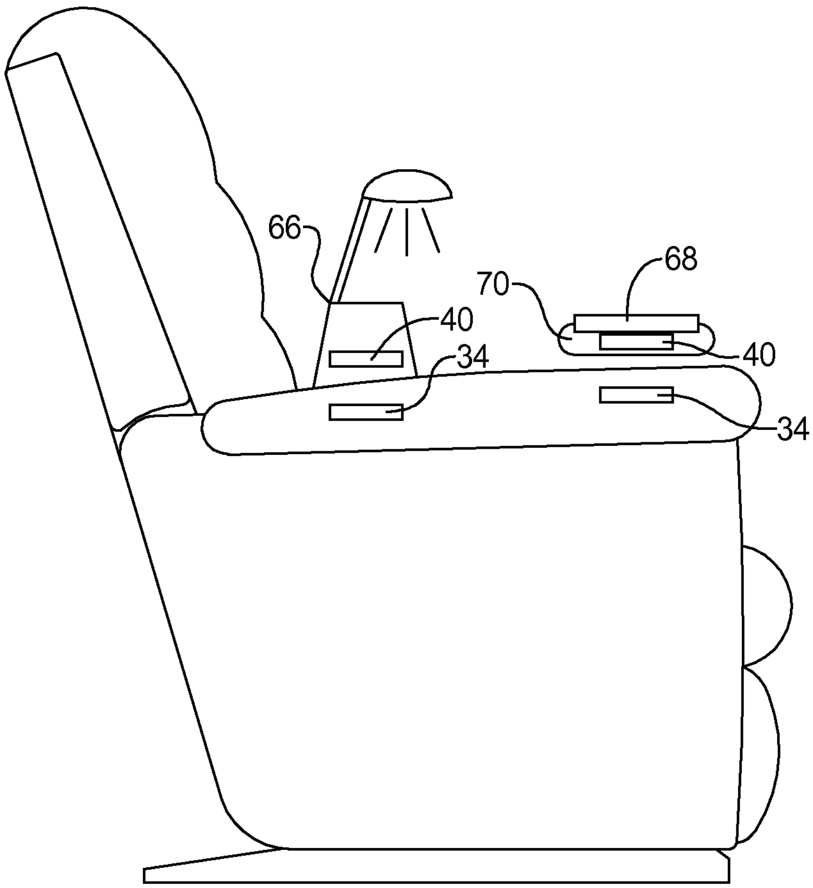
FIG. 7 illustrates how receiving resonator can be integrated into case of consumer devices, such as cell phone, e-book reader and reading light.

FIG. 7 provides some additional examples of powered devices. Illustrated is a portable convenience reading lamp 66 with a receiving resonator 40 and associated power conversion circuitry mounted in its base. Similarly cell phone 68 (or other portable device such as an e-reader or iPad) is snapped into a protective case 70 that includes an embedded receiving resonator 40 and associated power conversion circuitry. Of course, if desired, the cell phone or other portable device can be manufactured to include the receiving resonator 40.

Figure 8:
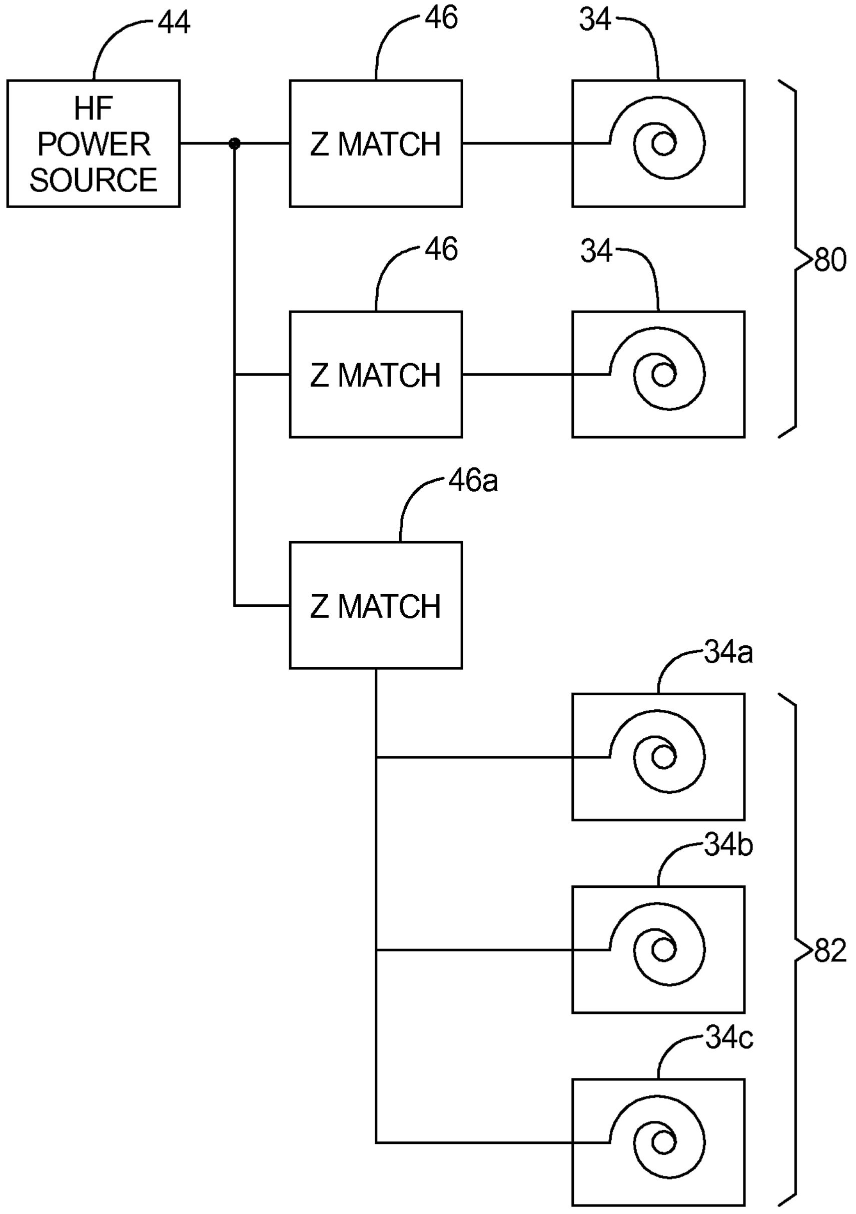
FIG. 8 is an electronic circuit diagram showing a first embodiment where plural transmitting resonators are driven by a common high frequency energy source.

As shown in FIG. 1, the transmitting resonators can be disposed at plural locations 22 in a typical chair or sofa. There are several ways to deploy these plural resonators as will now be explained with reference to FIGS. 8-10. FIG. 8 shows an embodiment where plural resonators are driven by a common high frequency power source 44. The power source 44 may be disposed within the chair or sofa by mounting it to a convenient location on the frame. Feed lines are then run to each of the plural transmitting resonators. In this regard, there are two ways to attach the feed lines, both of which are illustrated in FIG. 8. According to the one feed line technique each resonator 34 is coupled to the high frequency power source 44 via its own, dedicated impedance matching network circuit 46. Examples of this feed line technique are illustrated at 80. According to another feed line technique, a group of resonators 34*a*, 34*b*, 34*c* are attached to share a single impedance matching network circuit 46A. Examples of this feed line technique are illustrated at 82.

Figure 9:
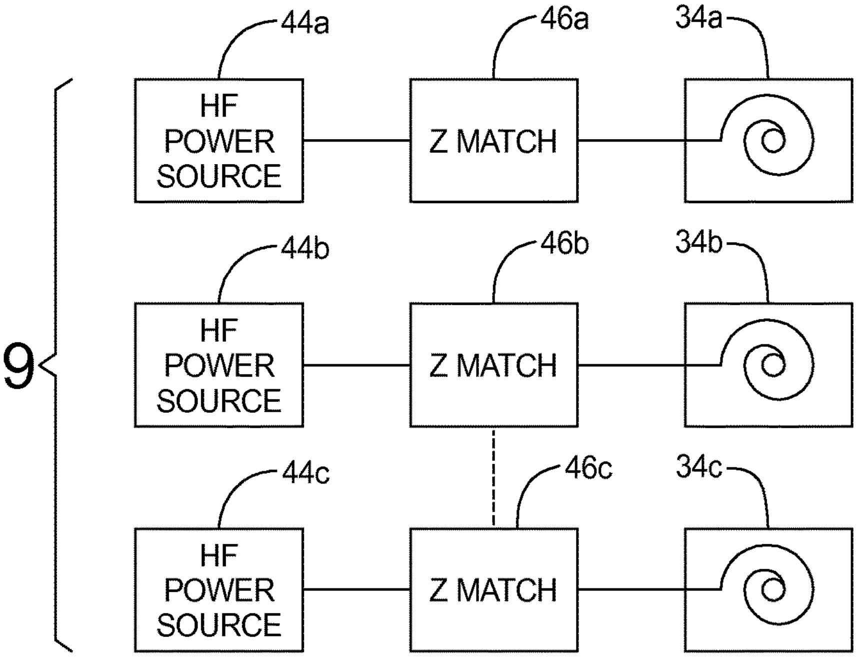
FIG. 9 is an electronic circuit diagram showing a second embodiment where plural transmitting resonators are each driven a dedicated high frequency source.
Figure 10:
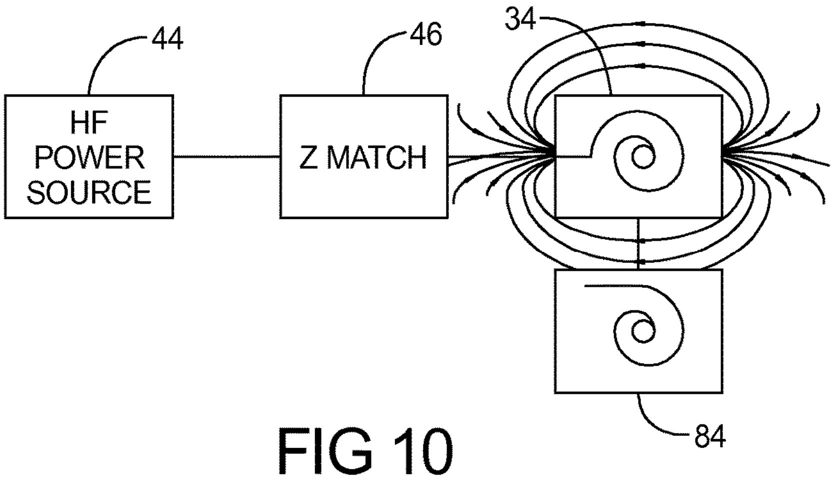
FIG. 10 is an electronic circuit diagram showing a driven transmitting resonator coupled to a first receiving resonator and also coupled to a passive repeater system coupled to a second receiving resonator.

FIG. 9 shows an alternate embodiment where each transmitting resonator 34*a*, 34*b*, 34*c* has its own dedicated high frequency source 44*a*, 44*b*, 44*c*, respectively. FIG. 10 shows yet another embodiment where passive repeaters 84 are deployed. The passive repeaters are tuned to resonate at the same frequency as the other transmitting resonators and effectively extend the range of a transmitting resonator to which it is magnetically coupled.

If desired, passive repeaters can be configured to extend the range of a transmitting resonator to plural locations. Special compound passive resonators can be constructed that provide several separate but interconnected resonating structures that can be positioned at disparate locations. To illustrate this concept, refer to FIG. 11. As shown, the HF power source 44 drives the transmitting resonator 34. Positioned within the magnetic field of the transmitting resonator is a first passive resonator A, at 84*a*. This first passive resonator A magnetically couples with the transmitting resonator 34 as indicated by the dotted lines Tr. Passive resonator A is electrically coupled to a second passive resonator B (84*b*) by at least one conductor 88 such as a wire connection which supports electrical current flow between the resonators. When the first passive resonator A is positioned within the magnetic field of the transmitting resonator 34, a current flow is induced in passive resonator A and that current is conveyed to passive resonator B. Thus passive resonators A and B are electrically joined to define a compound passive resonator 90.

The compound passive resonator 90 is able to support separate power transfer sites, which may be used in the alternative or concurrently. As illustrated, a first receiving resonator A (40*a*) may be placed within the magnetic field of passive resonator A, which magnetically couples the two as shown by the dotted line A. When a load, such as load A (86*a*) is electrically connected to the receiving resonator A, energy is transferred to the load 86*a*. Similarly, a second receiving resonator B (40*b*) may be placed within the magnetic field of passive resonator B, which magnetically couples the two as shown by the dotted fine B. When a load, such as load B (86*b*) is electrically connected to the receiving resonator B, energy is transferred to the load 86*b*.

The conductor 88 can be implemented according to several alternate embodiments, a first embodiment using a pair of twin lead connecting wires to define a feed line or transmission line between passive resonators A and B; and a second embodiment using a single wire that joins resonators A and B. A third embodiment uses a metal structure that forms part of the frame of the article of furniture.

The coils comprising resonators 40*a* and 40*b* are tuned to resonance with the HF power source frequency. Tuning is accomplished by selecting the length of the conductors comprising each coil to achieve an inductive reactance that matches the capacitive reactance resulting from the fact that the coils define spaced apart conductors. If needed, additional discrete capacitor components can be added across the ends of the coils to increase the capacitive reactance. Fine tuning of the capacitive reactance can also be accomplished by varying the spacing between individual turns that define the coils.

Passive Resonators Connected by Twin Lead Feed Line

Figure 12:
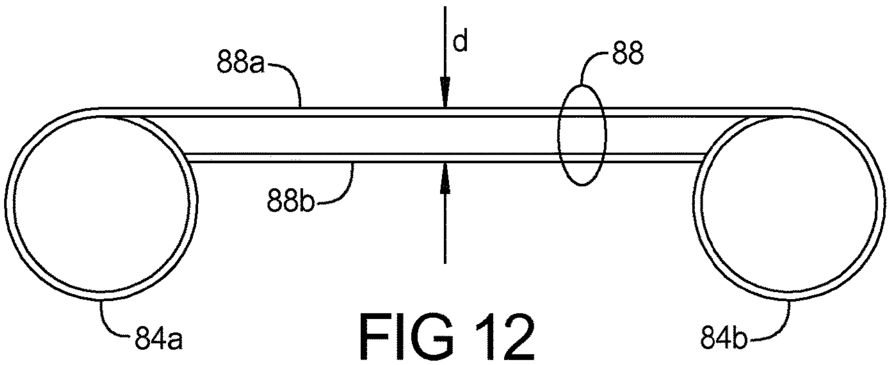
FIG. 12 is an elevation view of a compound passive resonator employing a twin lead feed line.
Figure 13:
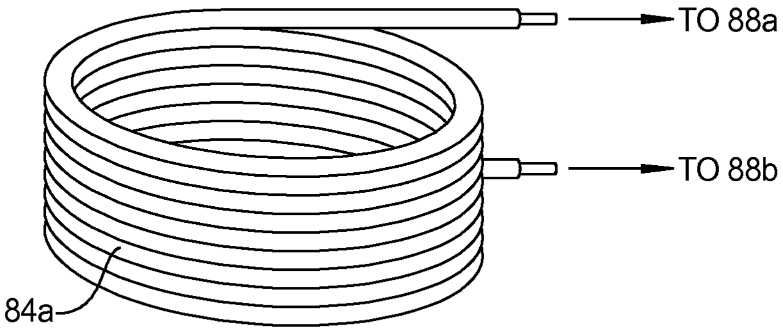
FIG. 13 is a perspective view of a passive resonator coil of the embodiment of FIG. 12.
Figure 14:
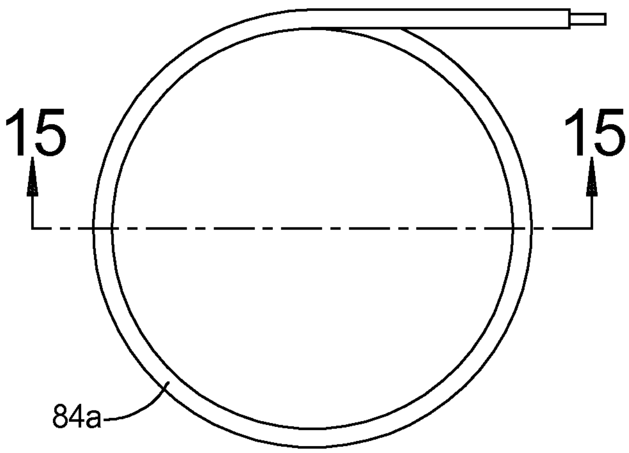
FIG. 14 is a top plan view of the coil of FIG. 13.
Figure 15:
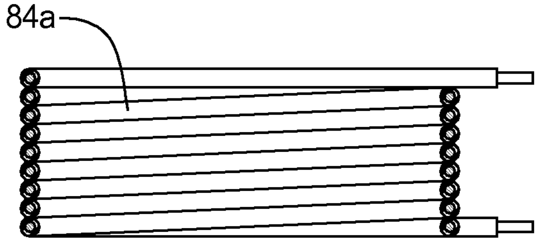
FIG. 15 is a cross sectional view of the coil of FIG. 13 taken substantially along the line 13-13 in FIG. 14.

FIGS. 12-19 illustrate the first embodiment of compound passive resonators where two coils are interconnected by a pair of twin lead connecting wires. Referring to FIG. 12, the passive resonators 84*a* and 84*b* are connected by a twin lead feed line 88 comprising a first lead 88*a* coupled to one end of each of the two passive resonator coils, and comprising a second lead 88*b* coupled to the other end of each of the two passive resonator coils. FIGS. 13-15 show in more detail how the resonator coils of this embodiment may be configured. In the disclosed embodiment the coils are air wound; the coils are held together by suitable glue or backing material so that the space within the center of the coil is left open (i.e. filled with air). If desired, the coils can also be fabricated by wrapping around a core structure, such as a hollow tube. While the air wound coil has been effective in matching the transmitting resonator frequency, it is possible to construct coils that are filled with a non-air core material. This will affect the inductance of the coil and hence the resonant frequency of the passive resonator. If required to achieve resonance at the HF power source frequency, discrete capacitors can be electrically coupled to each of the coils at the respective points where the leads 88*a* and 88*b* are attached. Such capacitors have not been shown in FIG. 12 to simplify the illustration, but several different circuit diagrams for capacitor placement have been illustrated in FIGS. 24*a*-24*d*.

Figure 19:
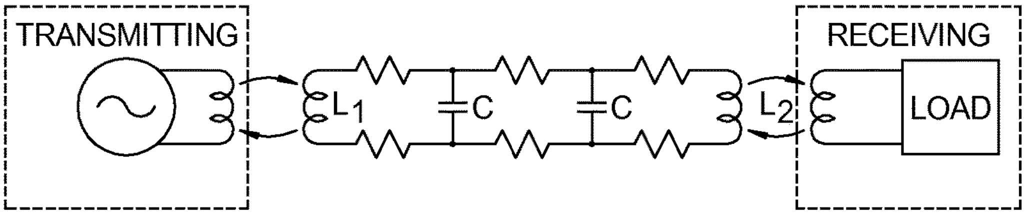
FIG. 19 is a simplified distributed element equivalent circuit diagram of the twin lead feed line of FIG. 12.

Referring again to FIG. 12, the spacing d between leads 88*a* and 88*b* is preferably maintained constant, so that the spacing and the diameter of the leads 88*a* and 88*b* define a fixed impedance. FIG. 19 shows a simplified distributed circuit model of the twin lead connecting wires. As illustrated the wires have a distributed capacitance between them. Each wire has a distributed resistance and a distributed inductance. To simplify the illustrating the distributed inductance has not been shown, but it will be understood that the distributed inductance is connected in series with the distributed resistance.

Preferably the wire spacing and wire diameter are chosen to establish an impedance where the capacitance (capacitive reactance) of the feed line is low, or at least a known and stable value. Minimizing or controlling the capacitive reactance of the twin lead connecting wire feed line is important as the capacitive reactance can have an effect on the overall resonance of the passive resonators. As noted above, these resonators need to be resonant at the same frequency as the transmitting resonator in order to have maximum power transfer.

When one of the coils, such as coil 84*a* is placed in the magnetic field of a transmitting resonator, current is caused to flow through the coil by virtue of the magnetic inductance. Because coil 84*a* is coupled by a closed circuit through feed line 88 to coil 84*b*, a like current will flow through coil 84*b*. There will of course be some energy loss as escaping heat, due to the internal resistance of the coils and feed line. In practice, this energy loss has proven minimal and successful energy transfer can be obtained using either of the passive resonator coils.

Figure 17:
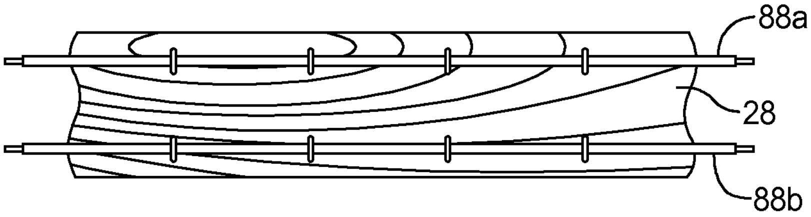
FIG. 17 is a partial plan view of the furniture frame, showing a first embodiment for securing the twin lead feed line of FIG. 12.

As noted above, to control the capacitive reactance of the feed line 88, it is preferable to establish a constant spacing between the individual wires 88*a* and 88*b* of the feed line. A first way to accomplish this is shown in FIG. 17, where the wires 88*a* and 88*b* are suitably affixed, such as with staples, to a wooden railing member 28 that forms part of the frame of the chair or sofa. In this embodiment the two wires 88*a* and 88*b* are embedded in a dielectric medium that comprises open air on one side and wooden frame on the other. Because the wires are placed against the surface of the wooden frame, the direct line of sight electric field line between the two wires passes through an air medium.

Figure 18:
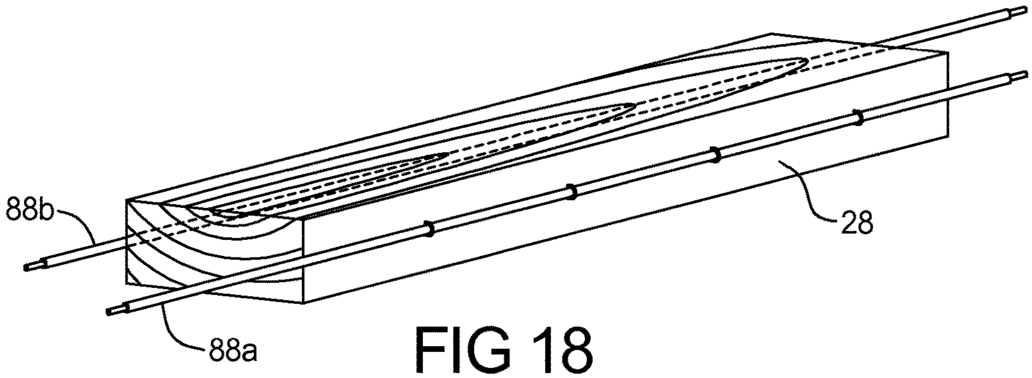
FIG. 18 is a partial perspective view of the furniture frame, showing a second embodiment for securing the twin lead feed line of FIG. 12.

A second way to establish a constant spacing between the individual wires 88*a* and 88*b* is shown in FIG. 18. In this embodiment the wires are suitably affixed, such as with staples, on opposite sides of a wooden railing member 28. In this embodiment the wooden railing member serves as the dielectric between the two wires. Because wood has a higher dielectric constant than air (wood=1.4 to 2.9; air=1.0) the capacitance between the wires in the second embodiment is higher than that of the first. Because capacitive reactance is inversely proportional to capacitance, the capacitive reactance of the second embodiment is lower than that of the first.

Figure 16:
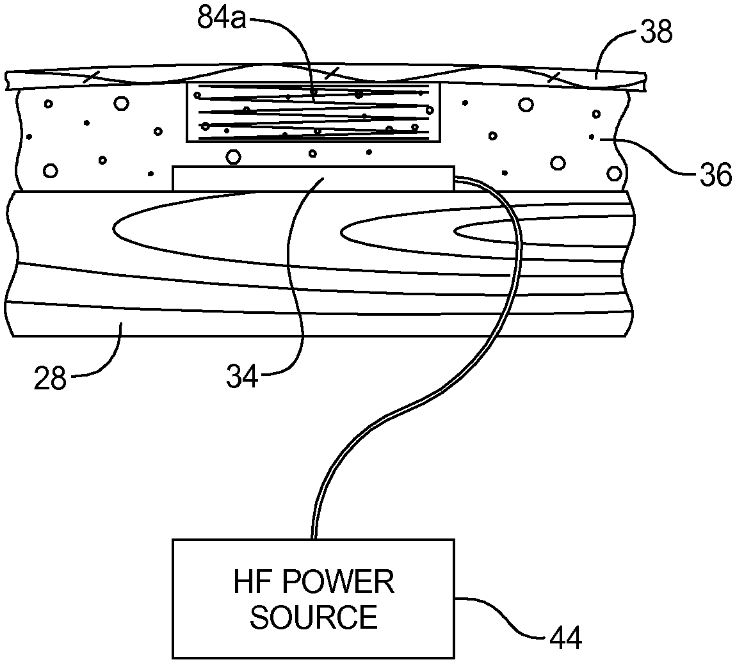
FIG. 16 is a partial cross sectional view of the furniture frame, showing placement of the coil of FIG. 13 as installed.

The passive resonator coils can be installed in the chair or sofa by embedding the coil within the upholstery padding or foam 36, as shown in FIG. 16. The passive resonator coil is positioned generally above the transmitting resonator 34, which is affixed to the frame 28 of the chair or sofa.

Passive Resonators Connected by Single Wire

Figure 20:
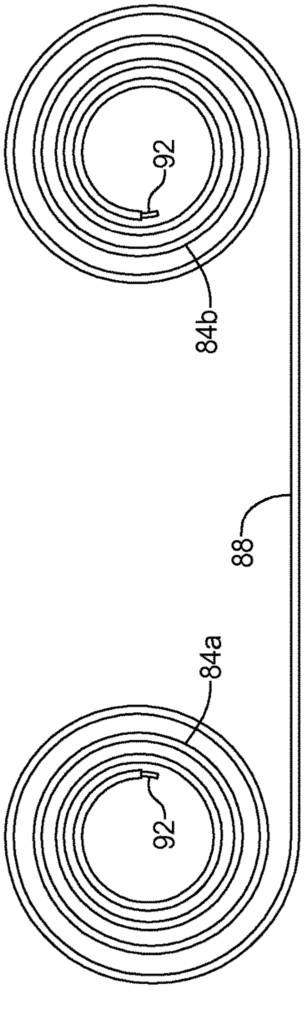
FIG. 20 is an elevation view of a compound passive resonator employing a single connecting wire to join a pair of planar circular spiral coils.
Figure 21:
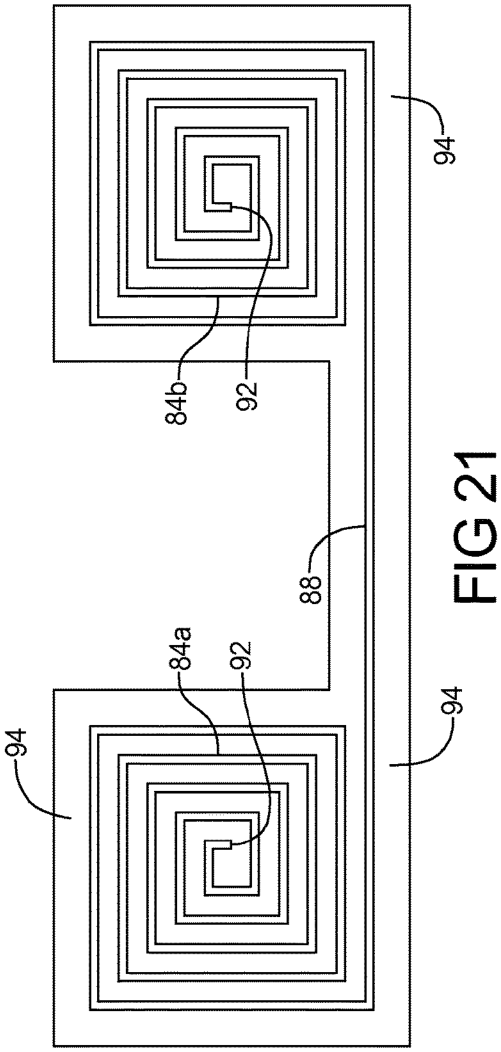
FIG. 21 is an elevation view of a compound passive resonator employing a single connecting wire to join a pair of planar rectangular spiral coils disposed on a flexible substrate.

FIGS. 20 and 21 show an alternate compound passive resonator embodiment where the coils are connected by a single wire that joins the resonators. In this embodiment the coils are wound as flat coils or pancake coils where the coil wire lies in a substantially flat plane. FIG. 20 illustrates a pair of circular spiral coils 84*a* and 84*b* joined by a single connecting wire 88. FIG. 21 illustrates a pair of square spiral coils 84*a* and 84*b* joined by a single connecting wire 88. Other coil shapes are also possible.

Whereas the compound passive resonator embodiment of FIGS. 12-19 employs coils connected together in a closed circuit electrical path using twin lead wires 88*a* and 88*b*, the embodiment of FIGS. 20 and 21 do not define a closed circuit path. Rather the two coils 84*a* and 84*b* of FIGS. 20 and 21 define a resonant antenna structure where the wire connector 88 defines part of the resonant antenna structure. When one of the coils, such as coil 84*a* is placed in the magnetic field of the transmitting resonator 34, a current is induced in the coil that establishes a standing wave current distribution pattern that depends upon the respective impedances of coils 84*a* and 84*b* and upon the length of wire connector 88. The current distribution pattern on the compound passive resonator structure behaves a boundary condition that the current is zero at coil endpoints 92 and exhibits one or more current maxima in between (depending on the length of the wire connector 88.

The coil of FIG. 21 illustrates an embodiment where the coils 84*a* and 84*b* and single connecting wire 88 are formed as a printed circuit board trace disposed on a flexible plastic substrate 94.

Figure 11:
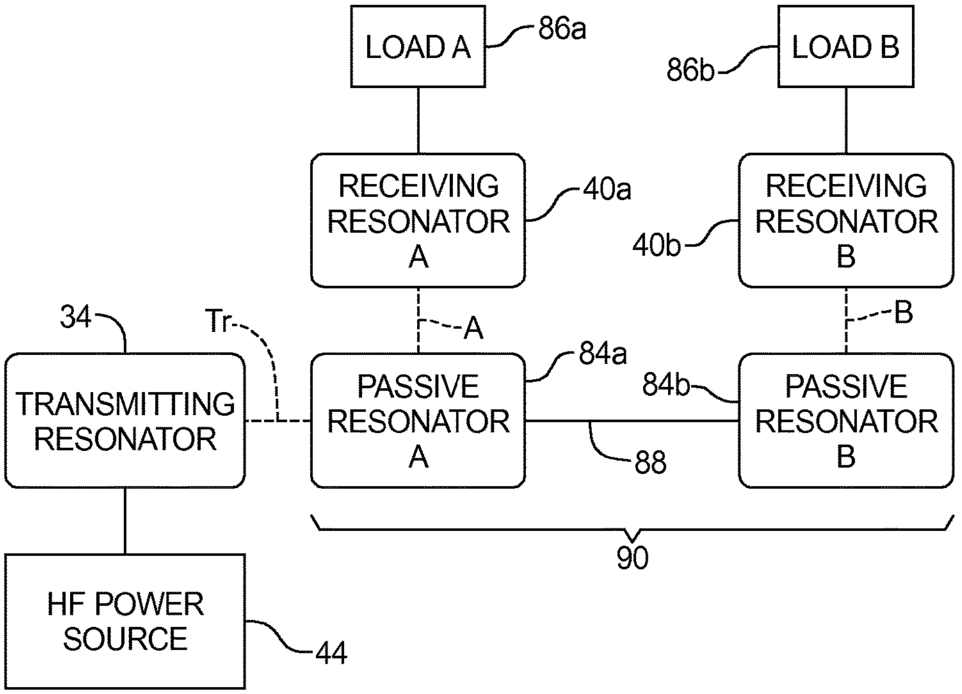
FIG. 11 is a block diagram showing the compound passive resonator.

FIG. 22 shows an alternate way of connecting the coils 84*a* and 84*b*, where the wire connection 88 joins the innermost ends of the respective coils. Also shown in FIG. 22 are a pair of capacitors C that are electrically connected in parallel with the respective coils 84*a* and 84*b*. These capacitors provide increased capacitive reactance to match the inductive reactance of the respective coils, so that the coils are each resonant at the transmitting frequency of the HF power source 44 (FIG. 11). If desired, the overall capacitive reactance can be fine-tuned by adjusting the spacing of selective wire turns within each of the coils. Increasing the spacing between wires will reduce the capacitance and thus increase the capacitive reactance (capacitance and capacitive reactance being inversely proportional).

While the compound passive resonators illustrated so far have featured a pair of coils, it is possible to construct a compound passive resonator that employs more than two coils. By way of illustrative example, refer to FIG. 23, where a three-coil compound passive resonator has been illustrated. This three-coil compound passive resonator works essentially the same as the two-coil compound passive resonator, with the exception that the respective coils may need to be re-tuned so that each achieves resonance with the HF power source. Tuning is accomplished, as discussed above, by adding discrete capacitors, and by adjusting the inter wire spacing and the respective lengths of the connecting wires 88.

Placement of Transmitting and Passive Resonators

FIG. 1 provides some examples of locations where transmitting resonators and passive resonators may be placed in an exemplary reclining chair. Of course, as discussed, the disclosed power transmission apparatus and method works with other types of furniture. To illustrate, FIG. 25 shows a contemporary sofa frame, illustrating how a compound passive resonator described above can incorporated into the piece. In this example, the single wire connector embodiment is featured. The single wire conductor 88 is routed behind the springs in the back of the sofa as illustrated.

FIG. 26 shows a different conductor arrangement where the coils are connected via a metal frame component 97 that spans across the back of the chair. The individual passive coils 84*a* and 84*b* are electrically connected by individual wires 92*a* and 92*b* to the frame component 97. Note that the chair of FIG. 26 is an open-arm style. Thus the transmitting resonator 34 and passive repeater coils 84*a* and 84*b* are positioned on the stretcher rail 96, as shown. While the chair of FIG. 26 illustrates an open-arm style, it will be appreciated that the same transmitting resonator and passive repeater coil placement may be employed with armless chairs.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An apparatus for wireless power transfer comprising:

an article of furniture having an internal frame and an upholstery covering;

at least one transmitting resonator carried by said frame and disposed at least partially beneath said upholstery covering;

the at least one transmitting resonator being tuned for resonance at a predetermined frequency;

a high frequency power source carried by said frame and electrically coupled to said at least one transmitting resonator, the high frequency power source being further adapted for coupling to a source of electric power external to the article of furniture;

the high frequency power source and the at least one transmitting resonator producing in the near field adjacent the at least one transmitting resonator a magnetic field that couples and transfers power at the predetermined frequency, and at least one compound passive resonator carried by said frame and disposed at least partially beneath said upholstery covering; the compound passive resonator having a portion thereof being disposed in the near field adjacent the at least one transmitting resonator and being operative to extend the magnetic field produced by the at least one transmitting resonator;

the compound passive resonator comprising at least two coils electrically connected by a conductive component of said frame to define an antenna having no direct current flow path between the at least two coils.

2. The apparatus of claim 1 further comprising a receiving resonator adapted to be electrically coupled to a load device, the receiving resonator being tuned for resonance at the predetermined frequency and when placed in the near field adjacent the transmitting resonator transferring power received from the transmitting resonator to the load device.

3. The apparatus of claim 1 wherein the at least one transmitting resonator includes an impedance matching circuit that increases a Q factor of the transmitting resonator.

4. The apparatus of claim 2 wherein the receiving resonator includes an impedance matching circuit that increases a Q factor of the receiving resonator.

5. The apparatus of claim 1 wherein the article of furniture is a chair or sofa having a seat, a back and at least one arm and wherein the at least one transmitting resonator is disposed in a portion of the chair or sofa selected from the group consisting of the seat, the back, the at least one arm.

6. The apparatus of claim 1 wherein the article of furniture is a chair or sofa having a seat, and a back and wherein the at least one transmitting resonator is disposed in at least one of said seat and said back.

7. The apparatus of claim 1 wherein the article of furniture is a chair or sofa having an extendable leg rest and wherein the at least one transmitting resonator is disposed in said leg rest.

8. The apparatus of claim 7 further comprising a pair of footwear each having a receiving resonator and an attached heating element incorporated therein, the receiving resonator being positioned in the footwear so that the receiving resonator lies within the near field of the at least one transmitting resonator disposed in said leg rest when the footwear are worn by a person seated in said chair or sofa.

9. The apparatus of claim 1 further comprising a heating pad having a receiving resonator disposed therein, the heating pad having a heating element electrically coupled to said receiving resonator, the heating element receiving electrical power transferred from the at least one transmitting resonator via the receiving resonator.

10. The apparatus of claim 1 further comprising a heating blanket or shawl having a receiving resonator disposed therein, the heating blanket or shawl having a heating element electrically coupled to said receiving resonator, the heating element receiving electrical power transferred from the at least one transmitting resonator via the receiving resonator.

11. The apparatus of claim 1 wherein one of said at least two coils is positioned within the near field adjacent the at least one transmitting resonator.

12. A method for outfitting an article of furniture for wireless power transfer comprising:

in an article of furniture having an internal frame and an upholstery covering, providing at least one transmitting resonator carried by said frame and disposed at least partially beneath said upholstery covering;

tuning the at least one transmitting resonator for resonance at a predetermined frequency;

supporting a high frequency power source by said frame and electrically coupling said high frequency power source to said at least one transmitting resonator, configuring the high frequency power source to be coupled to a source of electric power external to the article of furniture;

configuring the high frequency power source and the at least one transmitting resonator to produce in the near field adjacent the at least one transmitting resonator a magnetic field that couples and transfers power at the predetermined frequency when coupled to a source of electrical power external to the article of furniture, and further providing at least one compound passive resonator carried by said frame and disposed at least partially beneath said upholstery covering;

the compound passive resonator having a portion thereof being disposed in the near field adjacent the at least one transmitting resonator and being operative to extend the magnetic field produced by the at least one transmitting resonator;

the compound passive resonator comprising at least two coils electrically connected by a conductive component of said frame to define an antenna having no direct current flow path between the at least two coils.

13. The method of claim 12 further comprising providing a receiving resonator adapted to be electrically coupled to a load device;

tuning the receiving resonator for resonance at the predetermined frequency such that when the receiving resonator is placed in the near field adjacent the transmitting resonator the receiving resonator transfers power received from the transmitting resonator to the load device.

14. The method of claim 13 further comprising attaching to the at least one transmitting resonator an impedance matching circuit that increases a Q factor of the transmitting resonator.

15. The method of claim 13 further comprising attaching to the receiving resonator an impedance matching circuit that increases a Q factor of the receiving resonator.

16. The method of claim 12 wherein the article of furniture is a, chair or sofa having a seat, a back and at least one arm and further comprising installing the at least one transmitting resonator in a portion of the chair or sofa selected from the group consisting of the seat, the back, the at least one arm.

17. The method of claim 12 wherein the article of furniture is a chair or sofa having an extendable leg rest and further comprising installing the at least one transmitting resonator in said leg rest.

18. The method of claim 17 further comprising providing a pair of footwear each having a receiving resonator and an attached heating element incorporated therein, and adapting the receiving resonator to be positioned in the footwear so that the receiving resonator lies within the near field of the at least one transmitting resonator disposed in said leg rest when the footwear are worn by a person seated in said chair or sofa.

19. The method of claim 12 further comprising providing a heating pad having a receiving resonator disposed therein, and having a heating element electrically coupled to said receiving resonator to receive electrical power transferred from the at least one transmitting resonator via the receiving resonator.

20. The method of claim 12 further comprising providing a heating blanket or shawl having a receiving resonator disposed therein, the heating blanket or shawl having a heating element electrically coupled to said receiving resonator, the heating element receiving electrical power transferred from the at least one transmitting resonator via the receiving resonator.

21. The method of claim 12 wherein one of said at least two coils is positioned within the near field adjacent the at least one transmitting resonator.

22. An article of furniture, comprising:

a frame and an upholstery covering supported by said frame;

at least one transmitting resonator carried by said frame and disposed at least partially beneath said upholstery covering;

the at least one transmitting resonator being tuned for resonance at a predetermined frequency;

a high frequency power source carried by said frame and electrically coupled to said at least one transmitting resonator, the high frequency power source being further adapted for coupling to a source of electric power external to the article of furniture;

the high frequency power source and the at least one transmitting resonator producing in the near field adjacent the at least one transmitting resonator a magnetic field that couples and transfers power at the predetermined frequency at least one compound passive resonator carried by said frame and disposed at least partially beneath said upholstery covering;

the compound passive resonator having a portion thereof being disposed in the near field adjacent the at least one transmitting resonator and being operative to extend the magnetic field produced by the at least one transmitting resonator;

the compound passive resonator comprising at least two coils electrically connected by a conductive component of said frame to define an antenna having no direct current flow path between the at least two coils.

23. The article of furniture according to claim 22 wherein the frame defines a seat and a back and wherein the at least one transmitting resonator is disposed in at least one of said seat and said back.

24. The article of furniture according to claim 23 wherein the frame further defines at least one arm and wherein the at least one transmitting resonator is disposed in at least one of said seat, said back and said arm.

25. The article of furniture according to claim 24 wherein said frame and said upholstery define an arm that substantially encloses an open area generally beneath the arm and wherein said at least one transmitting resonator is disposed on said frame in a location proximate to said open area.

26. The article of furniture according to claim 22 wherein the frame further defines a seat and a back and wherein the at least one passive resonator is disposed in at least one of said seat and said back.

27. The article of furniture according to claim 22 wherein the frame further defines at least one arm and wherein the at least one passive resonator is disposed in said arm.

28. The article of furniture according to claim 22 wherein said passive repeater resonator has a first coil disposed in the near field adjacent the at least one transmitting resonator and a second coil disposed outside the near field of the transmitting resonator.

29. The method of claim 17 further comprising providing a pair of footwear each having an attached heating element comprising a metal foil incorporated therein, and adapting the receiving resonator to be positioned in the footwear so that the heating element lies within the near field of the at least one transmitting resonator disposed in said leg rest when the footwear are worn by a person seated in said chair or sofa.

* * * * *